(12) United States Patent
Suzuki

(10) Patent No.: US 7,415,879 B2
(45) Date of Patent: Aug. 26, 2008

(54) ANGULAR VELOCITY SENSOR AND ANGULAR VELOCITY DETECTOR

(75) Inventor: Takahiko Suzuki, Tokyo (JP)

(73) Assignee: TDK Corporation, Tokyo (JP)

( * ) Notice: Subject to any disclaimer, the term of this patent is extended or adjusted under 35 U.S.C. 154(b) by 427 days.

(21) Appl. No.: 10/555,571

(22) PCT Filed: Mar. 30, 2004

(86) PCT No.: PCT/JP2004/004544

§ 371 (c)(1),
(2), (4) Date: Nov. 4, 2005

(87) PCT Pub. No.: WO2004/102117

PCT Pub. Date: Nov. 25, 2004

(65) Prior Publication Data

US 2007/0012107 A1    Jan. 18, 2007

(30) Foreign Application Priority Data

May 16, 2003   (JP) .............................. 2003-138739

(51) Int. Cl.
*G01P 9/04* (2006.01)
(52) U.S. Cl. ................................. 73/504.12
(58) Field of Classification Search ............. 73/504.12, 73/504.13
See application file for complete search history.

(56) References Cited

FOREIGN PATENT DOCUMENTS

| | | |
|---|---|---|
| GB | 2 310 284 A | 8/1997 |
| JP | A 05-001917 | 1/1993 |
| JP | A 7-20140 | 1/1995 |
| JP | A 7-260492 | 10/1995 |
| JP | A 8-278147 | 10/1996 |
| JP | A 9-196686 | 7/1997 |
| JP | A 10-148641 | 6/1998 |
| JP | A 10-267667 | 10/1998 |
| JP | A 2001-174263 | 6/2001 |

*Primary Examiner*—John E Chapman
(74) *Attorney, Agent, or Firm*—Oliff & Berridge, PLC

(57) ABSTRACT

The present invention provides a cheap angular velocity sensor capable of detecting angular velocity with high precision by using a vibrational mode which cannot be obtained by external vibration. The angular velocity sensor includes: a vibrator (2) made of a magnetostrictive material; a first coil (4) disposed along a first plane which includes an axis (A) of the vibrator (2), the first coil enclosing the vibrator; a supporter supporting the vibrator (2) at a position where the axis (A) crosses the surface of the vibrator (2), the supporter made of a nonmagnetic material; and a second coil (6) disposed along a second plane which crosses the first plane and includes the axis (A), the second coil enclosing the vibrator (2) and the first coil (4). The first coil (4) generates a magnetic field in the vibrator (2) on the basis of an excitation current supplied, thereby making the vibrator (2) vibrate in the direction of the magnetic field, and the second coil (6) detects a magnetic flux change caused by a change in the vibration of the vibrator (2), the change in the vibration occurring depending on angular velocity.

4 Claims, 4 Drawing Sheets

ANGULAR VELOCITY SENSOR AND ANGULAR VELOCITY DETECTOR

TECHNICAL FIELD

The present invention relates to an angular velocity sensor using a vibrator made of a magnetostrictive material and to an angular velocity detector using the angular velocity sensor.

BACKGROUND ART

To detect angular velocity, various methods are used. Among them, as an angular velocity sensor having a relatively simple structure and, moreover, which is cheap, there is a widely used angular velocity sensor employing a method of detecting angular velocity by detecting, by some method, a Coriolis force generated in the direction orthogonal to the vibration direction when the angular velocity is applied to the vibrator in a one-dimensional vibration motion state. The angular velocity sensor is called a rate gyro. In particular, the angular velocity sensor using the vibrator is generally called a vibration gyro. In the vibration gyro, in many cases, a vibration member is made by using piezoelectric ceramics and, when angular velocity is applied to the vibration member vibrated by applying AC voltage, a displacement which occurs in the vibrator by the Coriolis force is extracted as an electric signal by the piezoelectric effect, and angular velocity is detected.

However, the piezoelectric angular velocity sensor using the piezoelectric ceramics has the following problems. Specifically, the angular velocity sensor has to employ either the configuration of adhering a piezoelectric element to a vibrator or the configuration of using a piezoelectric element as the vibrator itself. In either of the cases employed, to drive the piezoelectric element and detect an electric signal by the piezoelectric effect, a wire has to be connected to an electrode of the piezoelectric element. As a result, external vibration is transmitted to the vibrator via the wire, and a problem occurs such that the angular velocity cannot be detected accurately.

To solve the problem, for example, in a vibration gyro (10) described in Japanese Patent Laid-open No. Hei 5-1917, as shown in FIG. 1 of the publication, a vibrator (12) is supported by supporters (22a and 22b) attached near a node point. As shown in FIG. 2 in the publication, lead wires (24a and 24b) are wound around the supporter 22b along the vibrator (12). Further, the lead wires (24a and 24b) are attached to the vibrator (12) by an elastic adhesive (26) such as silicone from the supporter (22b) to a portion near piezoelectric elements (14a, 14b). Similarly, a lead wire (24c) is partially adhered to the elastic adhesive (26) along the vibrator (12) and is wound around the supporter (22a). With the configuration, in the vibration gyro (10), the lead wires (24a to 24c) are attached to the vibrator (12) by using the elastic adhesive (26), so that the elastic adhesive (26) functions as a damping material. Therefore, external vibration transmitted to the lead wires (24a to 24c) is damped (reduced) and, as a result, the influence of the external vibration on vending mode vibration of the vibrator (12) is lessened.

In the vibration gyro (10), however, since the damping characteristic changes according to the amount of the elastic adhesive (26), it is difficult to make the degree of lessening the external vibration constant (reproducibility is not excellent). Consequently, a problem exists such that it is difficult to detect the angular velocity with high precision. The elastic characteristic of the elastic adhesive (26) changes (deteriorates) due to temperature change or change with time. Therefore, the vibration gyro (10) also has a problem that it is difficult to excellently reduce leakage of vibration for long period. It is not easy to manage the elastic adhesive (26) and, moreover, workability of the elastic adhesive (26) is low. There is consequently a problem that it is also difficult to improve productivity of the vibration gyro (10).

As a method capable of more effectively reducing the influence on the vibrator of external vibration, a vibration gyro in which the vibrator is vibrated in a vibrational mode which is hardly set for the vibrator by the external vibration is proposed. As a vibration gyro of this kind, for example, a gyro (gyroscope) disclosed in Japanese Patent Laid-open No. Hei 10-267667 is known. In this gyro, a ring-shaped vibration resonator (1) is suspended in magnetostaic field by a plurality of flexible supporting beams (5), and a vibrational mode of vibrating the vibration resonator (1) by electromagnetic induction so that the shape can be changed from a ring shape to an oval shape or from the oval shape to the ring shape is used. Since the vibrational mode is hardly set by external vibration, in the structure, even when external vibration is added, the influence on the vibrational mode is extremely small. Therefore, in the gyro, also in the case where the external vibration is added, the angular velocity can be detected with precision.

The gyro has a problem that the plurality of flexible supporting beams (5) supporting the vibration resonator (1) have to be manufactured with high precision by using, for example, micromachining, so that the manufacturing cost is high.

On the other hand, in the angular velocity sensor disclosed Japanese Patent Lid-open No. Hei 7-20 140, excitation generated by a drive coil (12) is given to a vibrator (11) made of a magnetostrictive material, thereby generating bending mode vibration. When angular velocity is added to the vibrator (11) in the vibration state, the Coriolis force in the direction orthogonal to the vibration direction is generated in a leg portion of the vibrator (11). In this case, the vibration direction is slightly shifted (twisted) from the basic vibration direction by the Coriolis force. As a result, a stress acting on the leg portion changes, and magnetization caused by an inverse magnetostriction also changes. Consequently, in the angular velocity sensor, by detecting a change in the magnetization by detection coils (13a and 13b), the angular velocity applied to the vibrator (11) can be detected in a non-contact manner.

However, since the vibrational mode used in the angular velocity sensor (the vibrational mode of making the vibrator (11) vending mode vibrate) is a vibrational mode which is easily influenced by external vibration, the angular velocity sensor has a problem that it is difficult to detect the angular velocity with high precision.

As described above, conventionally, various angular velocity sensors have been developed. As described above, in the angular velocity sensors disclosed in Japanese Patent Laid-open Nos. Hei 5-1917 and Hei 7-20140, since the vibrator is easily influenced by the external vibration, a problem that it is difficult to detect the angular velocity with high precision exists. In the gyro disclosed in Japanese Patent Laid-open No. Hei 10-267667, although the influence of external vibration on the vibrator can be reduced, the problem such that the manufacturing cost becomes very high.

DISCLOSURE OF THE INVENTION

The present invention has been achieved in consideration of the problems and an object of the invention is to provide a cheap angular velocity sensor and angular velocity detector capable of detecting angular velocity with high precision by using a vibrational mode which cannot be set by external vibration.

An angular velocity sensor according to the present invention includes: a vibrator made of a magnetostrictive material in a disc shape in plan view; a first coil disposed along a first plane which includes an axis of the vibrator, the first coil enclosing the vibrator; a supporter supporting the vibrator at a position where the axis crosses the surface of the vibrator, the supporter made of a nonmagnetic material; and a second coil disposed along a second plane which crosses the first plane and includes the axis, the second coil enclosing the vibrator and the first coil. One of the first and second coils generates a magnetic field in the vibrator on the basis of an excitation current supplied, thereby making the vibrator vibrate in the direction of the magnetic field, and the other one of the first and second coils detects a magnetic flux change caused by a change in the vibration of the vibrator, the change in the vibration occurring depending on angular velocity.

Preferably, the angular velocity sensor has a case made of a magnetic material for housing the vibrator, the first coil, and the second coil.

A first angular velocity detector according to the invention is configured by disposing the angular velocity sensor described above on each of two axes orthogonal to each other.

A second angular velocity detector according to the invention is configured by disposing the angular velocity sensor described above on each of three axes orthogonal to each other.

As described above, in the angular velocity sensor according to the invention, one of the first and second coils generates a magnetic field in the vibrator on the basis of an excitation current supplied, thereby making the vibrator vibrate in the direction of the magnetic field, and the other one of the first and second coils detects a magnetic flux change caused by a change in the vibration of the vibrator, which occurs depending on angular velocity. In such a manner, the vibrator can be vibrated in the vibration state (vibrational mode) which cannot be set in a normal state. Thus, while avoiding inhibition of vibration to the vibrator by the supporter, even when external vibration is transmitted to the vibrator, the vibrator can be maintained in a vibration state in the basic vibration almost without an influence of the external vibration. Therefore, the angular velocity sensor can detect the angular velocity with high precision also in a state where the external vibration is applied. By employing the simple configuration of supporting the vibrator only by the supporter, the angular velocity sensor can be manufactured at sufficiently low cost.

In the angular velocity sensor according to the invention, by housing the vibrator, the first coil, and the second coil in the case made of magnetic material, leakage to the outside of the case of the magnetic field generated by one of the first and second coils can be prevented, and invasion of external magnetic field to the inside of the case is suppressed, thereby enabling the influence of the external magnetic field on the vibrator and the other one of the first and second coils to be reduced. Since the case configures a closed magnetic path for the magnetic field generated by one of the coils together with the vibrator, leakage magnetic flux can be reduced and, as a result, the vibrator can be vibrated more efficiently.

In an angular velocity detector according to the invention, the angular velocity sensor is disposed on each of two or three axes orthogonal to each other. Consequently, even in a state where external vibration is applied, the angular velocity in the two or three axes can be detected with high precision.

BEST MODE FOR CARRYING OUT THE INVENTION

Preferred embodiments of an angular velocity sensor and an angular velocity detector according to the present invention will be described hereinbelow by referring to the attached drawings.

First, the configuration of an angular velocity sensor according to the invention will be described with reference to the drawings.

Figure 1:
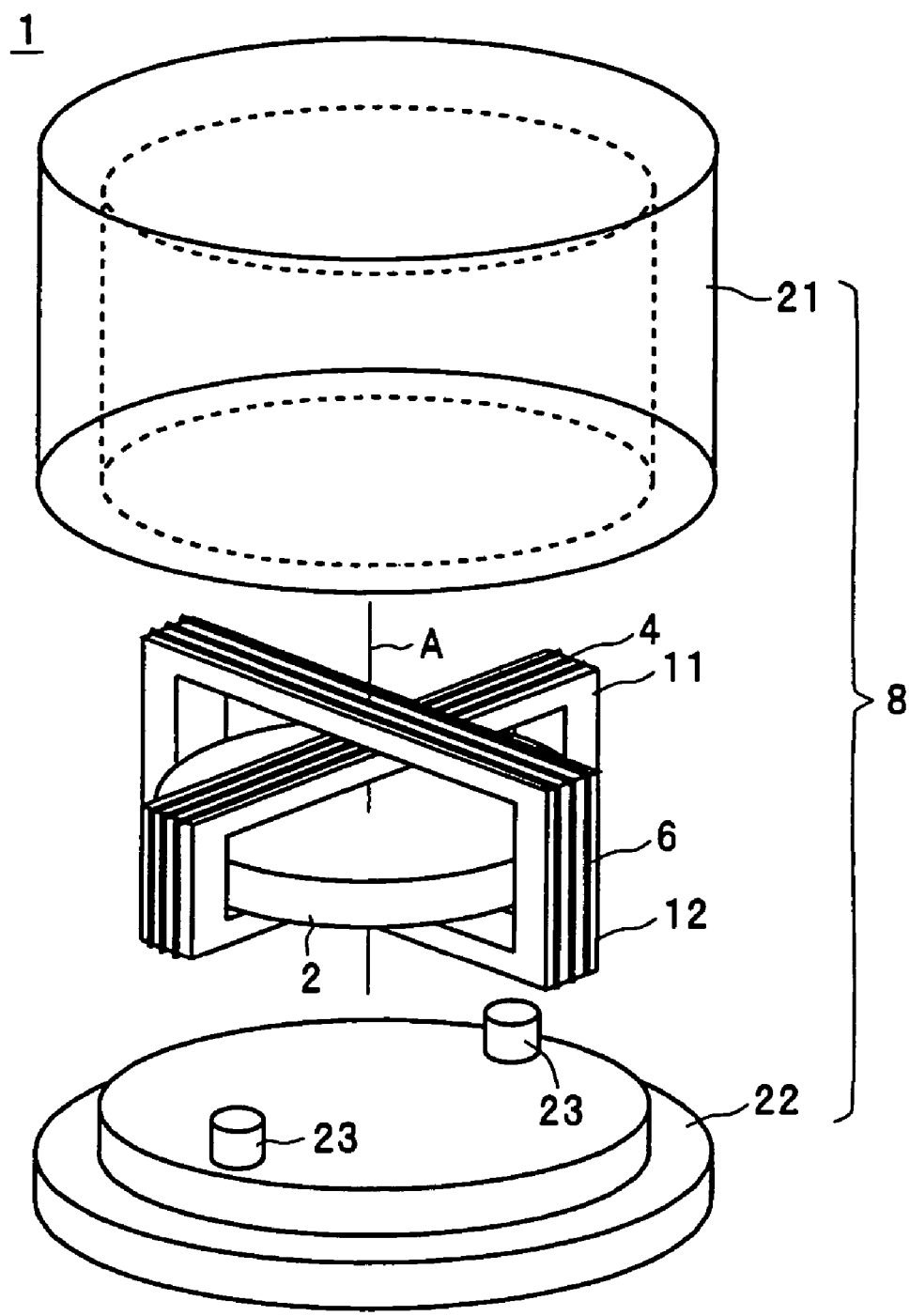
FIG. 1 is an exploded perspective view of an angular velocity sensor according to an embodiment of the present invention.
Figure 2:
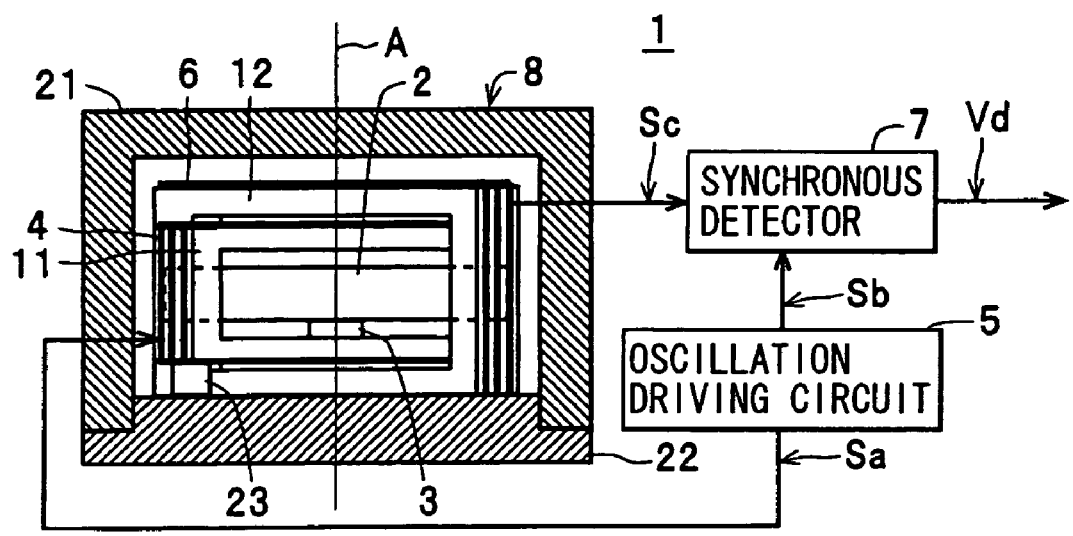
FIG. 2 is an explanatory diagram illustrating an internal structure of the angular velocity sensor, an oscillation driving circuit, and a synchronous detector.

An angular velocity sensor 1 has, as shown in FIGS. 1 and 2, a vibrator 2, a supporter 3, a first coil 4, an oscillation driving circuit 5, a second coil 6, a synchronous detector 7, and a case 8. In the embodiment, as an example, the first coil 4 is used as an excitation coil, and the second coil 6 is used as a detection coil. Consequently, the first coil 4 is also called an excitation coil 4, and the second coil 6 is also called a detection coil 6.

Figure 3:
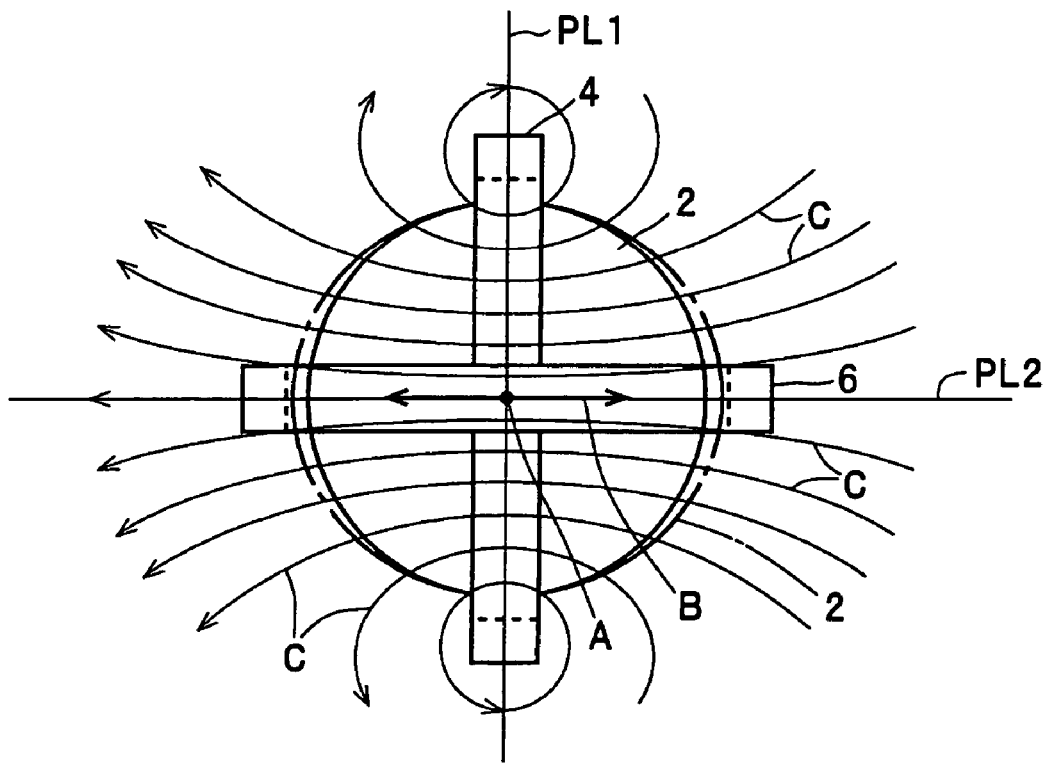
FIG. 3 is a plan view of a vibrator, an excitation coil, and a detection coil, indicating the direction of a combined magnetic field generated by the excitation coil, and the vibration direction of the vibrator in a state where no angular velocity is added to the angular velocity sensor.

In this case, as shown in FIG. 3, the vibrator 2 is formed in a disc shape in plan view (as an example, a flat disc member) by using a magnetostrictive material having a positive magnetostriction characteristic which extends irrespective of the direction of a magnetic field applied. In this case, as the magnetostrictive material, a material having a positive or negative magnetostriction characteristic, concretely, an Ni—Fe-base magnetostrictive material, an RFe-base magnetostrictive material, or the like can be used. As the magnetostrictive material, an isotropic magnetostrictive material whose direction indicative of the magnetostriction effect is random is used. To increase the efficiency of vibration in the vibrator 2, it is preferable to use an anisotropic magnetostrictive material whose direction is aligned with that of a magnetic field applied. In the case of using the anisotropic magnetostrictive material, the vibrator 2 is disposed in the direction along the direction of the arrow B orthogonal to a first plane PL1 in which the axis A (refer to FIG. 3) passes and the first coil 4 is disposed in the surface of the vibrator 2.

The supporter 3 is formed in a cylindrical shape as an example by using a nonmagnetic material. As shown in FIG. 2, one end face (under face) of the supporter 3 is fixed to the upper face of the lower frame of a bobbin 11 which will be described later in the first coil 4, the other end face (top face) of the supporter 3 is fixed to the center portion of the under face of the vibrator 2 (portion where the axis A passes in the surface of the vibrator 2) in a state where the axis of the supporter 3 and the axis A of the vibrator 2 coincide with each other and, while avoiding contact between the first and second coils 4 and 6, the vibrator 2 is supported. In this case, the center portion of the under face of the vibrator 2 functions as a center point (fixed point) of vibration by the vibrator 2. The fixed point has the property that even when magnitude or direction of the angular velocity applied to the angular velocity sensor 1 changes, the function as the center of vibration does not change. Therefore, without being influenced by vibration applied from the outside, accurate angular velocity detection can be performed in a wide angular velocity area.

As shown in FIGS. 1 and 2, the excitation coil 4 is formed by winding a wire (for example, covered copper wire) around the outer peripheral face of the bobbin 11 made of a nonmagnetic material (for example, a synthetic resin) formed in a frame shape having a rectangular shape in plan view. The excitation coil 4 is disposed so as to enclose the vibrator 2 on the first plane PL1 (refer to FIG. 3) including the axis A of the vibrator 2. The excitation coil 4 makes the vibrator 2 vibrate by applying to the vibrator 2 a magnetic field generated on the basis of a drive signal Sa supplied from the oscillation driving circuit 5.

As shown in FIG. 2, the oscillation driving circuit 5 generates the drive signal Sa and a reference signal Sb synchronously with the drive signal Sa, supplies the drive signal Sa to the excitation coil 4, and supplies the reference signal Sb to the synchronous detector 7. As an example, the oscillation driving circuit 5 generates, as the drive signal Sa, a signal obtained by superimposing DC voltage for applying the bias magnetic field to the vibrator 2 with AC voltage. Therefore, the vibrator 2 can be efficiently made vibrate in an area where linearity is high and a change amount is large.

As shown in FIGS. 1 and 2, the detection coil 6 is formed by winding a wire (for example, covered copper wire) around the outer peripheral face of a bobbin 12 made of a nonmagnetic material (for example, a synthetic resin) formed in a frame shape having a rectangular shape in plan view. The detection coil 6 is disposed so as to enclose the vibrator 2 and the excitation coil 4 on a second plane PL2 (refer to FIG. 3) crossing (in this example, orthogonal to) the first plane PL1 and including the axis A. As shown in FIG. 3, the detection coil 6 is disposed so as to be orthogonal to the excitation coil 4 in plan view. As mentioned below, the detection coil 6 detects an induced voltage according to the number of magnetic fluxes passing through (penetrating) the inside of the detection coil 6 among magnetic fluxes generated by the excitation coil 4.

The synchronous detector 7 synchronous-detects a signal Sc induced at both ends of the detection coil 6 by the voltage according to the number of magnetic fluxes passing through the detection coil 6 with the reference signal Sb, and outputs a DC detection voltage Vd having a voltage value according to the voltage value of the signal Sc and having the polarity (positive or negative) according the phase of the signal Sc.

The case 8 has, as shown in FIGS. 1 and 2, an upper case 21 and a lower case 22 each made of a magnetic material. In this case, the upper case 21 is formed in a cylindrical body whose one end (upper end in the diagrams) is closed and the lower end is opened. The diameter (inside diameter) of the upper case 21 is slightly larger than the length in the longitudinal direction in the excitation coil 4 and the detection coil 6 so that the members and the vibrator 2 can be housed. On the other hand, the lower case 22 is formed in a disc member capable of closing the open side (lower end side in the diagram) of the upper case 21, and functions as a cover for the upper case 21 and a stand on which the excitation coil 4 and the detection coil 6 are placed. As an example, the lower case 22 is configured as a disc member with a step which can be fit in the upper case 21, and whose center portion on the face on the upper case 21 side is formed in a cylindrical shape which can be fit in the upper case 21. With the configuration, in a state where the open side of the upper case 21 is closed with the lower case 22, relative positional deviation between the upper and lower cases 21 and 22 is prevented. On the upper surface of the center portion in the lower case 22, a pair of supporting stands 23 made of a nonmagnetic material for supporting the excitation coil 4 is disposed.

The detection coil 6 is placed on the top face of the center portion in the lower case 22 in the case 8 having such a configuration, and the excitation coil 4 is placed on the supporting stands 23 and 23 so that the axis A of the vibrator 2 and the axis of the case 8 coincide with each other, thereby housing the coils 4 and 6 and the vibrator 2 supported by the supporter 3 in the case 8. Therefore, the upper and lower cases 21 and 22 made of a magnetic material has a shield function of reducing the influence of the external magnetic field on the vibrator 2 and the detection coil 6 by preventing leakage of the magnetic field generated by the excitation coil 4 to the outside of the case 8 and suppressing invasion to the inside of the case 8 of the external magnetic field. The case 8 further has the function of forming a closed magnetic path for the magnetic field generated by the excitation coil 4 together with the vibrator 2.

The angular velocity detecting operation of the angular velocity sensor 1 will now be described with reference to the FIGS. 2 to 5.

In a state where the drive signal Sa is supplied from the oscillation driving circuit 5 to the excitation coil 4, as shown in FIG. 3, the excitation coil 4 generates a combined magnetic field C passing through the area where the vibrator 2 is disposed. In this case, the combined magnetic field C is generated by combining a bias magnetic field based on the DC voltage in the drive signal Sa and an alternating field based on the AC voltage in the drive signal Sa. Since the combined magnetic field C passes through a magnetic circuit (closed magnetic path) formed by the vibrator 2 and the upper case 21 disposed so as to surround the vibrator 2, the combined magnetic field C is efficiently supplied to the vibrator 2. The direction of the combined magnetic field C coincides with the direction (shown by the arrow B) in which the detection coil 6 shown in the diagram is disposed. In this state, when angular velocity around the axis A is not applied, the vibrator 2 repeats expansion and contraction in the direction shown by the arrow B and vibrates synchronously with the cycles of the AC voltage included in the drive signal Sa. Concretely, the vibrator 2 repeatedly deforms its planar shape from the circular shape to an almost oval shape or from the almost oval shape to the circular shape, and oscillates in the direction of expansion and contraction by using the first plane PL1 as a reference (center) (in FIGS. 3 to 5, deformation of the vibrator 2 is exaggerated, the state in which the vibrator 2 is deformed in an oval shape is indicated by the alternate long and short dash line, and a state in which the vibrator 2 is reset to the circular shape is indicated by the solid line). In this state, the direction of the combined magnetic field C becomes parallel with the detection coil 6, so that the magnetic flux hardly passes through the inside of the detection coil 6. Therefore, a voltage generated by the combined magnetic field C is hardly induced by the detection coil 6. For easier understanding, the vibration direction (the direction shown by the arrow B) of the vibrator 2 in this state will be also called a basic vibration direction.

Figure 4:
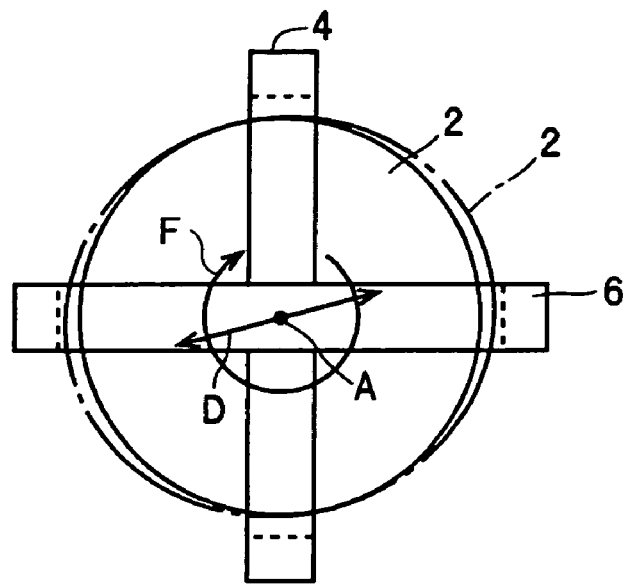
FIG. 4 is a plan view of the vibrator, the excitation coil, and the detection coil, indicating the direction of a magnetic field in the vibrator and the vibration direction of the vibrator in a state where clockwise angular velocity is added to the angular velocity sensor.

As shown in FIG. 4, in the case where the angular velocity in the clockwise direction (the direction of the arrow F in the diagram) around the axis A as a center is applied to the angular velocity sensor 1, Coriolis force of the magnitude according to the angular velocity is generated in the direction orthogonal to a basic vibration direction B in the vibrator 2, so that the vibration direction of the vibrator 2 changes from the basic vibration direction B to the vibration direction shown by the arrow D in the diagram. In this case, the deviation amount between the basic vibration direction B and the direction shown by the arrow D changes according to magnitude of the angular velocity. Similarly, the direction of the magnetic field (magnetic flux) passing through the inside of the vibrator 2 also changes (shifts) according to magnitude of the angular velocity in the same direction of the arrow D. Consequently, the magnetic flux passed in parallel with the wire of the detection coil 6 at the time of the basic vibration changes so as to cross the wire. As a result, the signal Sc according to magnitude of the angular velocity is induced at both ends of the coil 6. Therefore, the voltage value of the DC detection voltage Vd generated by the synchronous detector 7 also changes according to the angular velocity.

Figure 5:
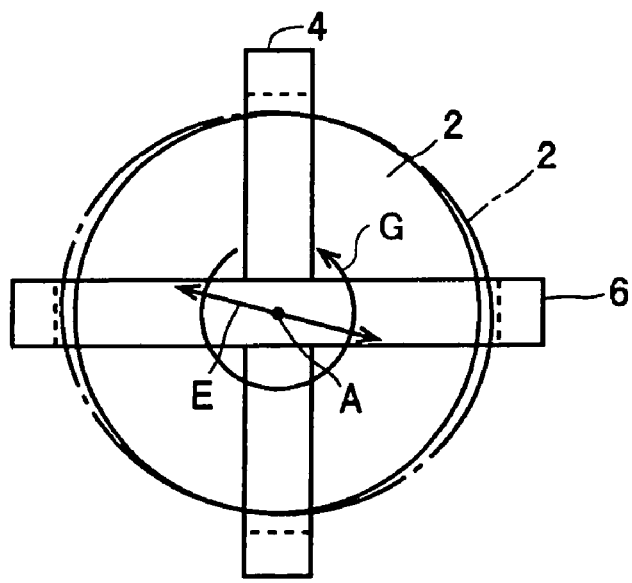
FIG. 5 is a plan view of the vibrator, the excitation coil, and the detection coil, indicating the direction of a magnetic field in the vibrator and the vibration direction of the vibrator in a state where counterclockwise angular velocity is added to the angular velocity sensor.

On the other hand, as shown in FIG. 5, in the case where the angular velocity in the counterclockwise direction (the direction of the arrow G in the diagram) around the axis A as a center is applied to the angular velocity sensor 1, the Coriolis force according to the angular velocity is generated in the vibrator 2 as described above, and the vibration direction of the vibrator 2 changes from the basic vibration direction B to the vibration direction shown by the arrow E in the diagram. In this case as well, the deviation amount between the basic vibration direction B and the direction of vibration indicated by the arrow E changes according to magnitude of the angular velocity. Similarly, the direction of the magnetic field (magnetic flux) passing through the inside of the vibrator 2 also changes (shifts) according to the angular velocity in the direction same as the arrow E. Consequently, the magnetic flux passing in parallel with the wire of the detection coil 6 at the time of the basic vibration changes so as to cross the wire. As a result, the signal Sc according to the angular velocity is induced at both ends of the coil 6. In this case, the polarity (phase) of the signal Sc becomes opposite (reverse phase) to that in the case where clockwise angular velocity is applied around the axis A as a center to the angular velocity sensor 1. Therefore, the voltage value of the DC detection voltage Vd generated by the synchronous detector 7 changes according to the angular velocity similarly except that the polarity (positive or negative) becomes opposite to that in the case where the clockwise angular velocity is applied around the axis A as a center to the angular velocity sensor 1.

Thus, by using the angular velocity sensor 1, the direction (clockwise or counterclockwise direction) of angular velocity applied to the angular velocity sensor 1 can be specified on the basis of the polarity of the DC detection voltage Vd generated by the synchronous detector 7 and, on the basis of the magnitude of the voltage value of the DC detection voltage Vd, magnitude of the angular velocity can be specified.

As described above, in the angular velocity sensor 1, the vibrator 2 is supported in a state of no contact with other members including the detection coil 6 by the supporter 3 fixed to the center portion as the fixed point in expansion/contraction vibrations, and the combined magnetic field C is generated in the vibrator 2 by the excitation coil 4 to make the vibrator 2 vibrate by making the vibrator 2 expand/contract like from the circular shape to an almost oval shape and from the oval shape to the circular shape by using the first plane PL1 passing through the center portion (the fixed point supported by the supporter 3) of the vibrator 2, that is, in a vibration state (vibrational mode) which cannot occur in a normal state. In such a manner, while avoiding inhibition of the vibration of the vibrator 2 by the supporter 3, even when external vibration is transmitted to the vibrator 2, the external vibration is not transformed to the vibrational mode of the vibrator 2. Consequently, without being influenced by the external vibration, the vibrator 2 can be maintained in a vibration state in the basic vibration. Therefore, the angular velocity sensor 1 can detect angular velocity with high precision also in a state where external vibration is applied.

Further, by employing a simple configuration of supporting the vibrator 2 by the supporter 3, the angular velocity sensor 1 can be manufactured at sufficiently low cost. By housing the vibrator 2, excitation coil 4, and detection coil 6 in the case 8 made of a magnetic material, leakage of the magnetic field generated by the excitation coil 4 to the outside of the case 8 can be prevented, invasion of the external magnetic fields to the inside of the case 8 is suppressed, and the influence of the external magnetic field onto the vibrator 2 and the detection coil 6 can be reduced. Since the case 8 configures a closed magnetic path for the magnetic field generated by the excitation coil 4 together with the vibrator 2, leakage magnetic flux can be reduced and, as a result, the vibrator 2 can be vibrated more efficiently.

The present invention is not limited to the foregoing embodiment. For example, the example of making the vibrator 2 vibrate by the combined magnetic field C generated on the basis of the drive signal Sa obtained by combining the DC voltage and the AC voltage has been described in the foregoing embodiment. Alternately, the drive signal Sa constructed only by the AC voltage without superimposing the DC voltage can be also used. With the configuration, since the DC voltage is not superimposed with the drive signal Sa, the oscillation driving circuit 5 can be prevented from becoming complicated. On the other hand, since no bias magnetic field is applied to the vibrator 2, the efficiency of making the vibrator 2 vibrate deteriorates. However, the oscillation driving circuit 5 can be configured simply, so that the angular velocity sensor 1 can be configured simply and cheaply. Further, the vibrator 2 can be made vibrate at a frequency twice as high as that in the configuration in which a bias magnetic field is applied by the DC voltage. Thus, the angular velocity sensor of high vibration frequency can be simply configured.

Although the example of supporting the vibrator 2 by the supporter 3 disposed between the center portion of the under face of the vibrator 2 and the lower frame of the bobbin 11 has been described in the foregoing embodiment, in place of the configuration, a configuration of supporting the vibrator 2 (in a suspended state) by the supporter 3 disposed between the center portion of the top face of the vibrator 2 and the upper frame of the bobbin 11 can be also employed. Further, a configuration of supporting the vibrator 2 from above and from below by disposing the supporters 3 between the center portion of the under face of the vibrator 2 and the lower frame of the bobbin 11 and between the center portion of the top face of the vibrator 2 and the upper frame of the bobbin 11 can be also employed. Further, a configuration in which one end (lower end) of the supporter 3 is fixed to the lower case 22, thereby directly supporting the vibrator 2 by the lower case 22 via the supporter 3 in place of the support via the bobbin 11 can be also employed. The case of using the first coil 4 closer to the vibrator 2 as the excitation coil and using the second coil 6 positioned on the outside of the first coil 4 as a detection coil in order to efficiently generate the magnetic field in the vibrator 2 has been described. Alternately, a configuration of using the first coil 4 as a detection coil and using the second coil 6 positioned on the outside of the first coil 4 as the excitation coil can be also employed.

Figure 6:
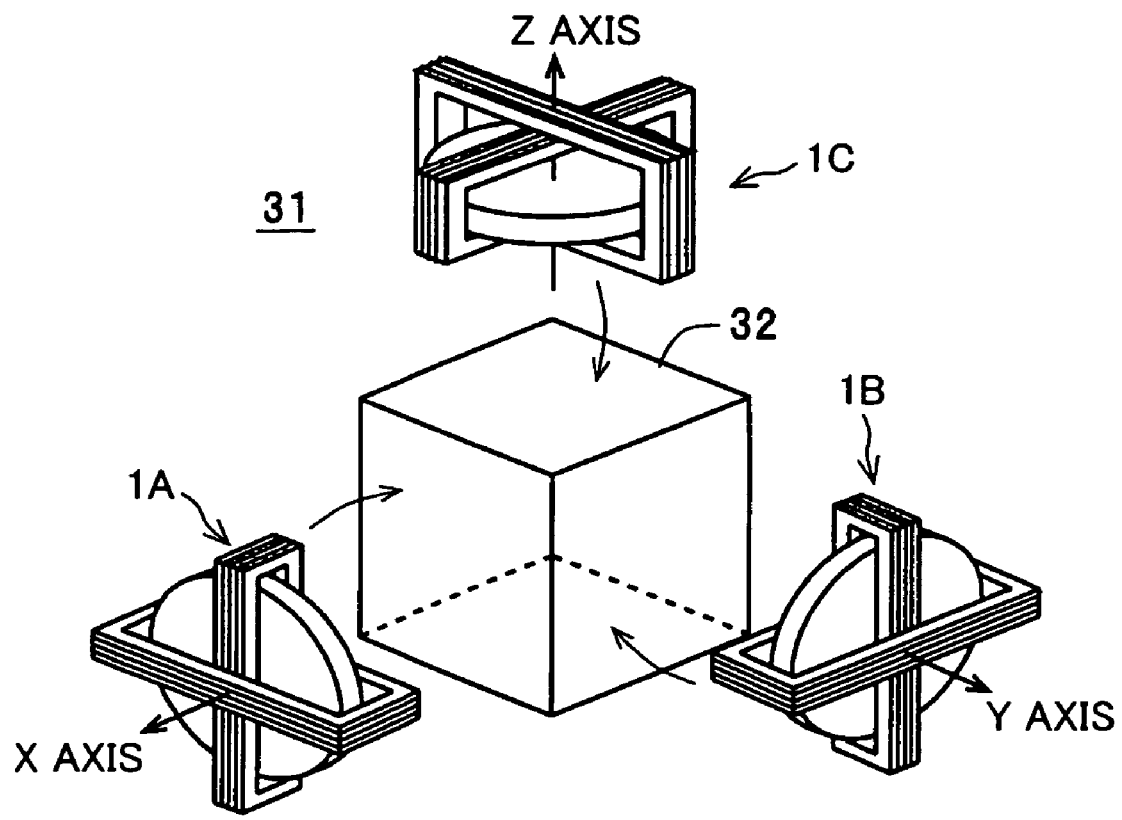
FIG. 6 is an exploded perspective view showing the configuration of an angular velocity detector using three angular velocity sensors.

The angular velocity sensor 1 can be used singly. As shown in FIG. 6, a three-axis angular velocity detector 31 can be also configured by combining three angular velocity sensors 1A, 1B, and 1C. The angular velocity detector 31 includes the three angular velocity sensors 1A, 1B, and 1C, a fixing member 32, and the oscillation driving circuits 5 and the synchronous detectors 7 (which are not shown) for the angular velocity sensors 1A, 1B, and 1C. In this case, the angular velocity sensor 1A is set so that its axis is in parallel with the X axis, the angular velocity sensor 1B is set so that its axis is in parallel with the Y axis, and the angular velocity sensor 1C is set so that its axis is in parallel with the Z axis. The angular velocity sensors 1A, 1B, and 1C are fixed to the fixing member 32. The angular velocity detector 31 can detect angular velocity in all of the three axes simultaneously. Although not shown, in the case of detecting the angular velocity added to an object which moves only in a predetermined plane, for example, a two-axis angular velocity detector can be also configured by the two angular velocity sensors 1A and 1B without using the angular velocity sensor 1C disposed in the Z axis in the diagram.

Obviously, the angular velocity sensor 1 and the angular velocity detector can be applied not only to a camera-shake correcting mechanism (unsteadiness correcting mechanism) employed for a video camera or the like but also to a navigation system and an attitude controller of a car, an airplane, or the like.

The invention claimed is:

1. An angular velocity sensor comprising:
 a vibrator made of a magnetostrictive material in a disc shape in plan view;
 a first coil disposed along a first plane which includes an axis of the vibrator, the first coil enclosing the vibrator;
 a supporter supporting the vibrator at a position where the axis crosses the surface of the vibrator, the supporter made of a nonmagnetic material; and
 a second coil disposed along a second plane which crosses the first plane and includes the axis, the second coil enclosing the vibrator and the first coil,
 wherein one of the first and second coils generates a magnetic field in the vibrator on the basis of an excitation current supplied, thereby making the vibrator vibrate in the direction of the magnetic field, and
 the other one of the first and second coils detects a magnetic flux change caused by a change in the vibration of the vibrator, the change in the vibration occurring depending on angular velocity.

2. The angular velocity sensor according to claim 1, further comprising a case made of a magnetic material for housing the vibrator, the first coil, and the second coil.

3. An angular velocity detector configured by disposing an angular velocity sensor on each of two axes which are orthogonal to each other,
 wherein each of the angular velocity sensors comprises:
 a vibrator made of a magnetostrictive material in a disc shape in plan view;
 a first coil disposed along a first plane which includes an axis of the vibrator, the first coil enclosing the vibrator;
 a supporter supporting the vibrator at a position where the axis crosses the surface of the vibrator, the supporter made of a nonmagnetic material; and
 a second coil disposed along a second plane which crosses the first plane and includes the axis, the second coil enclosing the vibrator and the first coil,
 wherein one of the first and second coils generates a magnetic field in the vibrator on the basis of an excitation current supplied, thereby making the vibrator vibrate in the direction of the magnetic field, and
 the other one of the first and second coils detects a magnetic flux change caused by a change in the vibration of the vibrator, the change in the vibration occurring depending on angular velocity.

4. An angular velocity detector configured by disposing an angular velocity sensor on each of three axes which are orthogonal to each other,
 wherein each of the angular velocity sensors comprises:
 a vibrator made of a magnetostrictive material in a disc shape in plan view;
a first coil disposed along a first plane which includes an axis of the vibrator, the first coil enclosing the vibrator;
 a supporter supporting the vibrator at a position where the axis crosses the surface of the vibrator, the supporter made of a nonmagnetic material; and
 a second coil disposed along a second plane which crosses the first plane and includes the axis, the second coil enclosing the vibrator and the first coil,
 wherein one of the first and second coils generates a magnetic field in the vibrator on the basis of an excitation current supplied, thereby making the vibrator vibrate in the direction of the magnetic field, and
 the other one of the first and second coils detects a magnetic flux change caused by a change in the vibration of the vibrator, the change in the vibration occurring depending on angular velocity.

* * * * *